US010841126B2

(12) United States Patent
Linney et al.

(10) Patent No.: US 10,841,126 B2
(45) Date of Patent: Nov. 17, 2020

(54) METHOD AND APPARATUS FOR OPERATING A TELECOMMUNICATIONS ACCESS NETWORK

(71) Applicant: British Telecommunications Public Limited Company, London (GB)

(72) Inventors: Trevor Linney, London (GB); Ian Horsley, London (GB); Peter Bell, London (GB); Nicholas Medlen, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 16/087,773

(22) PCT Filed: Mar. 29, 2017

(86) PCT No.: PCT/EP2017/057451
§ 371 (c)(1),
(2) Date: Sep. 24, 2018

(87) PCT Pub. No.: WO2017/167824
PCT Pub. Date: Oct. 5, 2017

(65) Prior Publication Data
US 2019/0116059 A1    Apr. 18, 2019

(30) Foreign Application Priority Data

Mar. 29, 2016  (EP) .................................. 16162719

(51) Int. Cl.
*H04L 12/28*    (2006.01)
*H04M 3/30*    (2006.01)
(Continued)

(52) U.S. Cl.
CPC ...... *H04L 12/2887* (2013.01); *H04L 12/2898* (2013.01); *H04L 12/423* (2013.01);
(Continued)

(58) Field of Classification Search
CPC ............ H04L 12/2887; H04L 12/2898; H04L 12/423; H04L 41/147; H04L 43/0894; H04M 11/062; H04M 3/306
See application file for complete search history.

(56) References Cited

U.S. PATENT DOCUMENTS 6,650,697 B1   11/2003   Tate et al.
6,895,081 B1 *  5/2005   Schmidt ................. G06Q 10/06
                                                      379/1.01
(Continued)

OTHER PUBLICATIONS

International Search Report and Written Opinion for corresponding PCT Application No. PCT/EP2017/057451, dated May 30 2017, 9 pages.

(Continued)

Primary Examiner — Stephen J Clawson
(74) Attorney, Agent, or Firm — Patterson Thuente Pedersen, P.A.

(57) ABSTRACT

An access network includes a twisted metallic pair connection over which data may be transmitted in accordance with a digital subscriber line protocol of transmission. The access network further includes an access network modem connected to the twisted metallic pair connection which is operable to transmit and receive signals thereover, in accordance with a digital subscriber line protocol of transmission. The access network further comprises a broadband speed estimation tool including a web server and/or an order processing sub-system 1120 and a line length, further deployment factors and speed determiner module 1170. The access network further comprises a line management sub-system which determines an appropriate value for each of one or more configuration parameters associated with the operation of the access network modem in dependence upon an estimated data rate and causes the access network modem (Continued)

to operate in accordance with the determined value or values of the configuration parameters.

4 Claims, 3 Drawing Sheets

(51) Int. Cl.
    *H04M 11/06*     (2006.01)
    *H04L 12/26*     (2006.01)
    *H04L 12/24*     (2006.01)
    *H04L 12/423*     (2006.01)

(52) U.S. Cl.
    CPC ........ *H04L 41/147* (2013.01); *H04L 43/0894* (2013.01); *H04M 3/306* (2013.01); *H04M 11/062* (2013.01)

(56) References Cited

U.S. PATENT DOCUMENTS

| | | | |
|---|---|---|---|
| 8,588,285 B2 | 11/2013 | Humphrey et al. | |
| 2003/0108191 A1* | 6/2003 | Kerpez | H04L 5/0046 379/399.01 |
| 2004/0071216 A1* | 4/2004 | Richardson | H04L 12/2883 375/240.21 |
| 2007/0121793 A1* | 5/2007 | Wang | H04M 3/306 379/1.04 |
| 2007/0259680 A1 | 11/2007 | Stolle et al. | |
| 2008/0170609 A1* | 7/2008 | Heidari | H04M 11/062 375/222 |
| 2008/0317161 A1 | 12/2008 | Pascal | |
| 2009/0010251 A1 | 1/2009 | Bullman et al. | |
| 2015/0281434 A1 | 10/2015 | Levonas et al. | |
| 2016/0080241 A1* | 3/2016 | Rocha De Maria | H04L 43/50 370/252 |

OTHER PUBLICATIONS

International Preliminary Report on Patentability for corresponding PCT Application No. PCT/EP2017/057451, dated Oct. 2, 2018, 6 pages.
GB Search and Examination Report for GB Application No. GB1605260.7; report dated Sep. 29, 2016; 5 pages.
International Telecommunication Union ITU-T G.993.2—Dec. 2011, Series G: Transmission Systems and Media, Digital Systems and Networks Digital sections and digital line systems—Access Networks, Very high speed digital subscriber line transceivers 2 (VDSL2), section 7.2.1.3.2 "Power back-off PSD mask", 376 pages.

* cited by examiner

US 10,841,126 B2

METHOD AND APPARATUS FOR OPERATING A TELECOMMUNICATIONS ACCESS NETWORK

CROSS-REFERENCE TO RELATED APPLICATION

The present application is a National Phase entry of PCT Application No. PCT/EP2017/057451, filed Mar. 29, 2017, which claims priority from EP Patent Application No. 16162719.5, filed Mar. 29, 2016 each of which is hereby fully incorporated herein by reference.

TECHNICAL FIELD

The present disclosure relates to a method and apparatus for operating a telecommunications access network.

BACKGROUND

In order to commence operation of a new Digital Subscriber Line (DSL) protocol over a broadband access network to a subscriber's premises, it is normal to perform some sort of measurement of the existing line to those premises in order to be reasonably certain that the proposed new service will be able to run over that connection and to estimate an approximate achievable rate or bandwidth that the connection may be able to support ("estimated speed" or "potential bandwidth"), to ensure that it is sensible to install the necessary equipment for running the new service.

Measuring a subscriber (telephone) line to obtain an estimated potential bandwidth thereof is therefore an important procedure for telecommunication access network operators. Having obtained such an estimate it is used for at least two important purposes—1) for "line qualification" purposes in which an access network operator determines if there is a reasonable likelihood of a line being able to support a particular service or level of service before installing the necessary equipment for such a service or level of service—and, additionally, the customer may be given an indication of the likely bandwidth at which such a service would be able to operate if s/he were to choose to sign up for such a service; and 2) for initial mode of operation selection when a new service or level of service is commenced on the line for the first time.

Such initial mode of operation selection is typically performed by applying a suitably selected "line profile" to the "line" (where "line"—in the context of applying a "line profile" to a "line"—includes the modems operating at each end of the twisted copper pair, which modems are, of course, the devices which are actually configurable by way of a suitable "line profile"). Note that, as will be well understood by persons skilled in the art of operating access networks, the "line profile" is composed of a set of values specified for certain configurable parameters which affect the way in which the modems operate (including, in particular, affecting how the communicating modems synchronize)—example configurable parameters which may be specified in a line profile are target margin, max rate, min rate, etc.

SUMMARY

Note that embodiments of the present disclosure are concerned with measuring a "line" to enable an estimate to be made of how the line will behave using a particular type of DSL transmission protocol (e.g. VDSL or G.fast, etc.) before the necessary equipment (i.e. modems) are installed and running at both ends of the line—thus the term line is generally used in the present application to mean the equipment (e.g. one or more pairs of twisted metallic wires) across which a particular pair of modems may establish a suitable connection, without including the modems themselves as part of the "line". This is contrary to normal industry usage (e.g. as in "line profile") in which the term "line" is normally used to refer to the complete line including the modems at both ends of the twisted metallic pair connection. Where it is not immediately apparent from the context which possible meaning is intended, the fuller terms "enabled line", or "line including the appropriate modems" may be used to refer to the case where the modems are included (as per conventional usage of the term) and the terms "bare line" or "line without the appropriate modems" or "twisted metallic pair connection" may be used to refer to the case where the modems are not included (i.e. to the meaning which will normally apply throughout the present specification).

The term "telephone" line or "subscriber" line is intended to refer to a twisted metallic pair (of wires) connection over which a Plain Old Telephone Service (POTS) service could be provided even if no such service is (or even ever has been) run over that line—e.g. because the line has only ever been used for carrying DSL services such as ADSL, VDSL2 and G.fast. Also note that although in general the pair of wires forming a twisted metallic pair connection are twisted in order to reduce the extent of interference onto the differential mode, it may be that at least a portion of the connection has a pair of wires which are not actually twisted (e.g. they could be arranged within a flat cable carrying the wires in parallel with one another).

A number of techniques are known for performing these measurements including Single Ended Line Testing (SELT) tests, Dual Ended Line Testing (DELT) tests and Metallic Line Testing (MELT) tests. However, the present inventors have realized that all of these tests result in increasingly imprecise estimations of actual bandwidth achievable in practice because they fail to take adequate account of deployment factors which can vary from one line to another and which affect the actual bandwidth ultimately achieved by the line; moreover, as lines are becoming shorter and as more powerful and exotic protocols are being employed (e.g. VDSL2 and G.fast compared to ADSL) the amount by which deployment factors can affect the ultimate bandwidth achievable by a given line is increasing. Important deployment factors include the type of modems used, and whether the Customer Premises Equipment (CPE) modem is installed by the customer or by an engineer.

According to a first aspect of the present disclosure, there is provided a method of operating an access network in order to transmit data over a predetermined twisted metallic pair connection in accordance with a predetermined digital subscriber line protocol of transmission, the access network including an access network modem connected to, or operable to be connected to, the predetermined twisted metallic pair connection which is capable of transmitting and receiving signals over the predetermined twisted metallic pair connection in accordance with the predetermined digital subscriber line protocol of transmission, the method comprising: receiving a deployment indication; identifying at least two deployment factors associated with the received deployment indication including an estimated line length specifying an estimated length of the predetermined twisted metallic pair connection and one or more further deployment factors; determining an estimated data rate specifying an estimated potentially achievable data rate at which the predetermined digital subscriber line protocol of transmission is able to transmit data over the predetermined twisted metallic pair connection, the estimated data rate being determined in dependence upon the identified deployment factors including the estimated line length and the one or more further deployment factors; determining a value for each of one or more configuration parameters associated with the operation of the access network modem connected to, or operable to be connected to, the predetermined twisted metallic pair connection in dependence upon the estimated data rate; deploying a customer premises equipment modem at a customer premises side of the twisted metallic pair, which modem is capable of transmitting and receiving signals over the predetermined twisted metallic pair connection in accordance with the predetermined digital subscriber line protocol of transmission; and operating the access network modem in accordance with the determined value or values of the one or more configuration parameters.

One embodiment thus provides a method of deploying a new DSL service (e.g. VDSL2 or G.fast) comprising: identifying a twisted metallic pair connection over which to deploy the service; estimating the physical and/or electrical length of the connection; identifying two or more deployment factors to be used in the deployment including a line length estimate and one or more further deployment factors (e.g. one or more modem types and/or types of modem chipsets); generating an estimated potentially achievable data rate at which the service may be able to operate based on the estimated physical and/or electrical length of the connection and on the one or more further deployment factors; setting configuration parameters based on the generated estimated potentially achievable data rate; deploying modems across the connection, and causing the modems to operate in accordance with the set configuration parameters.

Thus the method is applicable for a new installation of a new DSL service across a connection within an access network to a subscriber's premises. In such an embodiment, it may be that the twisted metallic pair connection which will be used for the new service is a "new" twisted copper pair in as much as it is different from that currently being used to provide an existing broadband service. For example, if the customer currently uses an Asymmetrical Digital Subscriber Line (ADSL) service and is considering upgrading to a Very-high-bit-rate Digital Subscriber Line service (VDSL) then it is likely that the existing service is supplied over a twisted copper pair extending between an Exchange building and the user's premises (via a street cabinet (Primary Cross-connection Point (PCP)) through which the connection is routed but not interrupted), whereas the new VDSL service would likely be supplied over a shorter copper pair extending only between the street cabinet and the user's premises (with an optic fiber connection connecting between the street cabinet and the Exchange building). This "new" twisted copper pair is, of course, likely to be just the final leg of the existing copper pair, but is nonetheless "new" in the sense that it is different from the original (much longer) twisted pair. Similarly, a user wishing to upgrade from a VDSL connection to a G.fast connection in the future might also involve switching from a copper pair connection between the street cabinet and the user's premises (via a Distribution Point (DP) to a "new" copper pair extending only between the DP and the user's premises.

The "predetermined twisted metallic pair connection" of the first aspect then corresponds to the "new" copper pair connection which possibly does not really exist yet (and which will only really exist once it is made by cutting the original connection near to the point at which the new connection will start—e.g. near the cabinet—and connecting it to a modem at the new start point of the connection—e.g. in the cabinet). Nonetheless, it is of course possible to "identify" this potential new line because its start and end points will at this stage in general already be known, since the location of the expected starting point of the connection (e.g. a street cabinet or a distribution point unit) will generally already be known when carrying out embodiments of the disclosure and can be identified by identifying the existing line.

Where the "new" pair is going to be the same as the existing pair, it is possible to get a direct measure of the attenuation over the line. However, where the "new" pair will be different from the existing pair, then it is preferred if the attenuation or an electrical length (see below) of the line is determined from an estimate of the physical length of the "new" pair. The attenuation of transmitted signals across a twisted copper pair has the greatest impact on the likely maximum potential broadband speed/bandwidth/rate which the line can support for a given pair of modems operating on either side of the connection using a specified DSL transmission protocol (e.g. VDSL or G.fast). Attenuation however varies as a function of frequency, and moreover a typical way of obtaining a measure for attenuation is actually to use a set of measured values which are measured and reportable by each DSL modem known as Hlog (see for example G.993.2 referred to below) and these values can be affected by extraneous interference.

As a result several techniques have been developed for estimating an "electrical length" (which is a concept embodied in various DSL standards including, for example, the International Telecommunications Union (ITU) standard G.993.2—see in particular section 7.2.1.3.2 "Power back-off PSD mask") of the line from reported Hlog values (see the above-referenced part of G.993.2 for example and U.S. Pat. No. 8,588,285 which describes the alternative method referred to in the standard in greater detail) and therefore can form the basis of a predetermined "rate versus reach" curve which specifies a relationship for a typical line between the "length" of that line and the estimated potentially achievable bandwidth or rate which the line is capable of supporting. Note that the electrical length is in most normal cases closely (and linearly) related to the physical length of the line (attenuation varies exponentially with length but electrical length is specified in dB's which is a logarithmic unit so that a linear relationship holds between electrical length specified in dB's and physical length specified in, say, meters) and so it is reasonable to use physical length as an alternative to electrical length. However, electrical length in normal lines varies linearly with physical length but also depends on other properties of the line—e.g. thickness. Nonetheless, since most lines in a given geographical area are likely to be formed from similar cables, once the relationship between electrical length and physical length for one line has been established, the same relationship can be reasonably used for all lines in that area (moreover if a new line is to be formed from just a part of the existing line, then, if the relationship between electrical length and physical length is known for the existing line, the same relationship can be expected to hold for the "new line"). Thus it is straightforward to obtain a relationship between physical length and electrical length which is good enough for the purposes of embodiments of the present disclosure in most cases.

In some embodiments, the further deployment factors include a type of Customer Premises Equipment (CPE) modem to be used at the remote end of the line and the type of access network modem to be used. Additionally and/or alternatively, the further deployment factors can include a chip set type which is used in a CPE modem, etc. In general, the term "deployment factors" is used in the present specification to refer to any set of factors that might have a material effect on the rate which a connection is able to achieve, including the length of the line. It should be noted that the number of deployment factors (other than length) actually used in embodiments is preferably kept quite small so as to keep the system manageable. However, in principle the number of deployment factors could be arbitrarily large since there are in practice a large number of factors that may have a material effect on the achievable speed of a broadband connection as will be well appreciated by persons skilled in the art). In practice at least one such further deployment factor and most preferably at least two such further deployment factors but preferably no more than four and most preferably no more than three such further deployment factors should actually be used. Where a model is used rather than a set of curves it may be advantageous to use more than four different further deployment factors with an approach by which most further deployment factors are assigned a default value which is used unless a specific connection has a determined alternative value for any such factor available. In this way scarce databases or possibilities to ascertain deployment factors can be accommodated and the database can be updated over time in a gradual manner.

In some embodiments, generating an estimated potential achievable data rate based on the estimate of the length of the twisted metallic pair connection and further in dependence upon the identified further deployment factors comprises generating as a preliminary step a plurality of rate versus reach functions for a plurality of different combinations of values of the further deployment factors, selecting one of the pre-generated rate versus reach functions in dependence upon the identified further deployment factor(s) and using the estimated line length, together with the selected rate versus reach function to generate an estimated potential achievable bandwidth.

In other embodiments, however, generating an estimated potential achievable data rate based on the estimate of the length of the twisted metallic pair connection and further in dependence upon the identified further deployment factors comprises preliminarily generating a model in the form of a function of estimated length and one or more deployment factors and applying the model using the identified deployment factors and the estimated line length to generate an estimated potential achievable bandwidth.

Pre-generating the rate versus reach functions may comprise performing testing in laboratory conditions with different types of modem (or different types of modem chipsets, etc.) to generate a specific rate versus reach function for each of a plurality of different combinations of types of modems (or types of modem chipsets, etc.). Alternatively, pre-generating the rate versus reach functions may be performed by obtaining diagnostic data from lines operating within the system and combining the data from all lines using the same combination of modems to generate a rate versus reach function for that combination of modems. In some embodiments, such functions are continuously updated as more lines are provisioned with the pre-determined service and therefore more diagnostic data associated with such lines becomes available.

Embodiments based on generating rate versus reach curves from measurements taken from other existing connections using the same modem types (or modem chipset types, etc.) can additionally include: determining an electrical length to physical length relationship appropriate for the predetermined twisted pair connection over which the new service is to be deployed; estimating the physical length of the predetermined twisted pair connection over which the new service is to be deployed; determining an estimated electrical length of the predetermined twisted pair connection over which the new service is to be deployed; and determining an estimated data rate in dependence upon the determined estimated electrical length of the predetermined twisted metallic pair connection over which the predetermined digital subscriber line protocol is to be deployed as well as the identified deployment factors.

Alternative embodiments may generate an estimated potential achievable data rate by pre-calculating an offset for each of a plurality of combinations of further deployment factors (e.g. modem types or modem chipset types, etc.), selecting an offset in dependence upon the identified further deployment factors and then generating an estimated potential achievable data rate by using a standard rate versus reach function to generate a standard rate value based on the received estimate of the length of the line and modifying that standard rate using a respective pre-calculated offset associated with the identified deployment factors.

According to a second aspect of the present disclosure, there is provided a method of generating an estimated data rate specifying an estimated potentially achievable data rate at which a digital subscriber line protocol of transmission is able to transmit data over a twisted metallic pair connection, for use in a method of operating an access network according to the above, the method comprising: receiving a deployment indication; identifying at least two deployment factors associated with the received deployment indication including an estimated line length and one or more further deployment factors, wherein the estimated line length specifies an estimated length of a twisted metallic pair connection associated with the received deployment indication, over which data may be transmitted in accordance with a digital subscriber line protocol of transmission associated with the received indication; and determining an estimated data rate in dependence upon the identified deployment factors including the estimated line length and the one or more further deployment factors.

In such a case, the deployment indication may include the identity of a web server making a request which initiates a broadband speed estimation test to be carried out. There are two important examples of such a request. A first example is receiving a request for an estimation of broadband speed at a qualification stage. A second example is receiving a request from a Communication Provider (CP) for provision of a new service to a specified customer of the CP.

In the first case, a request may arise at the qualification stage where a user is seeking to identify the speed of a broadband connection that s/he might be able to obtain in the event of deciding to order a new service from a particular Communication Provider (CP). In such a case a user may use a service provided by the CP's web site which acts as a portal to a service provided by a web server of the Network Operator (NO) (the NO's web server). Upon receiving a request from a user (a potential or existing customer for example)—e.g. by clicking on an icon offering to carry out a "broadband speed test" or some such technique—to perform an estimation of possible likely speed, the CP web server may capture suitable identification information from the user (e.g. a postcode or full address or an existing telephone number identifying the line over which the service is to (potentially) be provided, etc.) and forwards this to the NO's web server as a new request from the CP. Upon receipt of the request from the CP's web server, the NO's web server may then use its own tool to estimate the desired web speed.

This speed estimation tool is preferably similar to existing known such tools in that it uses the identification information identifying a particular subscriber line in conjunction with an identification of the service to be provided (e.g. a fiber to the Cabinet vs. an ADSL service (over a copper connection extending from an Exchange building, etc.) to query a database about loop lengths etc. to generate an estimate of the length of the line over which the service is (potentially) to be provided. This line length may then preferably be used in conjunction with a stored rate versus reach curve (e.g. in the form of a look up table) in order to obtain a rate value associated with the generated reach value. Naturally the rate versus reach curve is preferably specific to a particular broadband technology to be employed (e.g. VDSL vs. ADSL1 vs. ADSL2+, etc.). Additionally, however, in embodiments which operate in this manner, and unlike in conventional such tools, rather than there being just one rate versus reach curve for each particular broadband technology to be employed, there are a plurality of rate versus reach curves (or there is a single rate versus reach curve together with one or more offsets which can be used to achieve the same effect of a different rate versus reach curve—it being equivalent to being a different curve which is a translated curve, translated from the curve with which the offset is intended to apply by the offset amount). Each rate curve (for a single given type of broadband technology) preferably relates to a set of further deployment factors including one or more of an expected type of user modem and/or an expected type of user modem chipset.

In the case of the second example a request may be received at the NO's web server to provide a new connection to a specified user. In this case, the request may come directly from a server of the CP (rather than originally coming from an end user via the CP's web server acting as a portal). The request may again take the form of an electronic message such as a SOAP request (SOAP is a well-known computer network protocol whose name was originally an acronym for Simple Object Access Protocol) and will again include details of the premises to be connected. A similar process may then be performed by the NO's speed estimation tool as described above in order to generate an estimated potentially achievable speed/data rate based on the generated estimate of the applicable line length, the particular broadband technology to be employed and further deployment factors. Having generated the estimated potential speed, the NO's support systems can provision a new service to start at a time once the necessary modems have been connected to the line, and a line profile may be sent to the access network side modem (e.g. a Digital Subscriber Line Access Multiplexer (DSLAM)) in order to provide an initial configuration of the modems. Preferably the line profile which is sent is selected from a plurality of possible line profiles (and/or is generated by selecting certain values for parameters (from a series of sets of values which each parameter may take) a set of which parameters (with specified values therefore) forms a line profile). In some embodiments the selection (of line profile and/or of individual values for parameters forming the line profile) is performed on the basis of the generated estimated speed. In one embodiment, the selected (or generated) line profile is selected (or generated) to be one whose maximum speed is capped to a value which is no more than a predetermined amount greater than the generated estimated potential maximum speed.

According to a third aspect of the present disclosure, there is provided an access network including a twisted metallic pair connection over which, and/or over a portion of which, data may be transmitted in accordance with a digital subscriber line protocol of transmission of one or more types, the access network further including an access network modem connected to, or operable to be connected to, the twisted metallic pair connection, or a portion thereof, and which is operable to transmit and receive signals over the twisted metallic pair connection, or a portion thereof, in accordance with a digital subscriber line protocol of transmission; wherein the access network further comprises a broadband speed estimation tool including a web server and a line length, further deployment factors and speed determiner module, wherein the web server is operable to receive a deployment indication identifying the twisted metallic pair connection, an expected type of deployment and a type of digital subscriber line protocol of transmission of interest; and wherein the line length, further deployment factors and speed determiner module is operable to determine, from the deployment indication, at least two deployment factors including an estimated line length, specifying an estimated length of the identified twisted metallic pair connection, or a portion thereof, over which the digital subscriber line protocol of transmission of interest is potentially to be deployed, and one or more further deployment factors, and is further operable to determine an estimated data rate specifying an estimated potentially achievable data rate at which the digital subscriber line protocol of transmission of interest is able to transmit data over the identified twisted metallic pair connection, or a portion thereof, in dependence upon the determined deployment factors including the estimated line length and the one or more further deployment factors; and wherein the access network further comprises a line management subsystem for determining an appropriate value for each of one or more configuration parameters associated with the operation of the access network modem connected to, or operable to be connected to, the twisted metallic pair connection, or a portion thereof, in dependence upon the estimated data rate; and wherein in response to a deployment of a customer premises equipment modem, at a customer premises side of the twisted metallic pair connection, or a portion thereof, which customer premises equipment modem is operable to transmit and receive signals over the predetermined twisted metallic pair connection, or a portion thereof, in accordance with the type of digital subscriber line protocol of transmission of interest, the line management subsystem is further operable to determine a value for each of one or more configuration parameters associated with the operation of the access network modem and to cause the access network modem to operate in accordance with the determined value or values of the one or more configuration parameters.

It should be noted that the broadband speed estimation tool may be specific to a particular type of digital subscriber line transmission protocol. In such a case, no explicit identification of the type of protocol is required, as receipt of a deployment indication which does not include an explicit designation of protocol of interest is assumed to relate to the particular type of protocol with which the broadband speed estimation tool is concerned.

According to a fourth aspect of the present disclosure, there is provided a broadband speed estimation tool for use in an access network according to the third aspect of the present disclosure, the broadband speed estimation tool including: a web server; and a line length, further deployment factors and speed determiner module; wherein the web server is operable to receive a deployment indication identifying a twisted metallic pair connection, an expected type of deployment and a type of digital subscriber line protocol of transmission of interest; and wherein the line length, further deployment factors and speed determiner module is operable to determine, from the deployment indication, at least two deployment factors including an estimated line length, specifying an estimated length of the identified twisted metallic pair connection, or a portion thereof, over which the digital subscriber line protocol of transmission of interest is potentially to be deployed, and one or more further deployment factors, and is further operable to determine an estimated data rate specifying an estimated potentially achievable data rate at which the digital subscriber line protocol of transmission of interest is able to transmit data over the identified twisted metallic pair connection, or a portion thereof, in dependence upon the determined deployment factors including the estimated line length and the one or more further deployment factors.

The third and fourth aspects of the present disclosure address the access network in a state in which a "new" connection, as discussed above with reference to the first aspect of the present disclosure, has not yet actually been formed. Therefore these aspects refer to the possibility of a DSL transmission protocol (e.g. VDSL2 instead of ADSL2+ or G.fast instead of VDSL2) being transmitted over only a portion of the existing twisted metallic pair connection. Moreover, the speed estimation tool is in principle applicable to the possibility of deploying different types of upgrades. For example it is feasible that a customer with an old ADSL connection currently in place may be in a position to upgrade either to a VDSL2 connection from the cabinet or straight to a G.fast connection from a distribution point. By providing the speed estimation tool with an indication of which kind of upgrade is of interest it can estimate whichever achievable speed estimation is indicated by the customer as being of interest.

Further aspects of the present disclosure relate to a computer program or programs for carrying out the method or methods of other aspects of the present disclosure (including the first aspect) and to carrier media, for example non-transient carrier media such as optical or magnetic storage devices or solid state storage devices, etc., carrying such programs or processor implementable instructions.

BRIEF DESCRIPTION OF THE DRAWINGS

In order that the present disclosure may be better understood, embodiments thereof will now be described, by way of example only, with reference to the accompanying drawings in which.

DETAILED DESCRIPTION OF SPECIFIC EMBODIMENTS

Figure 1:
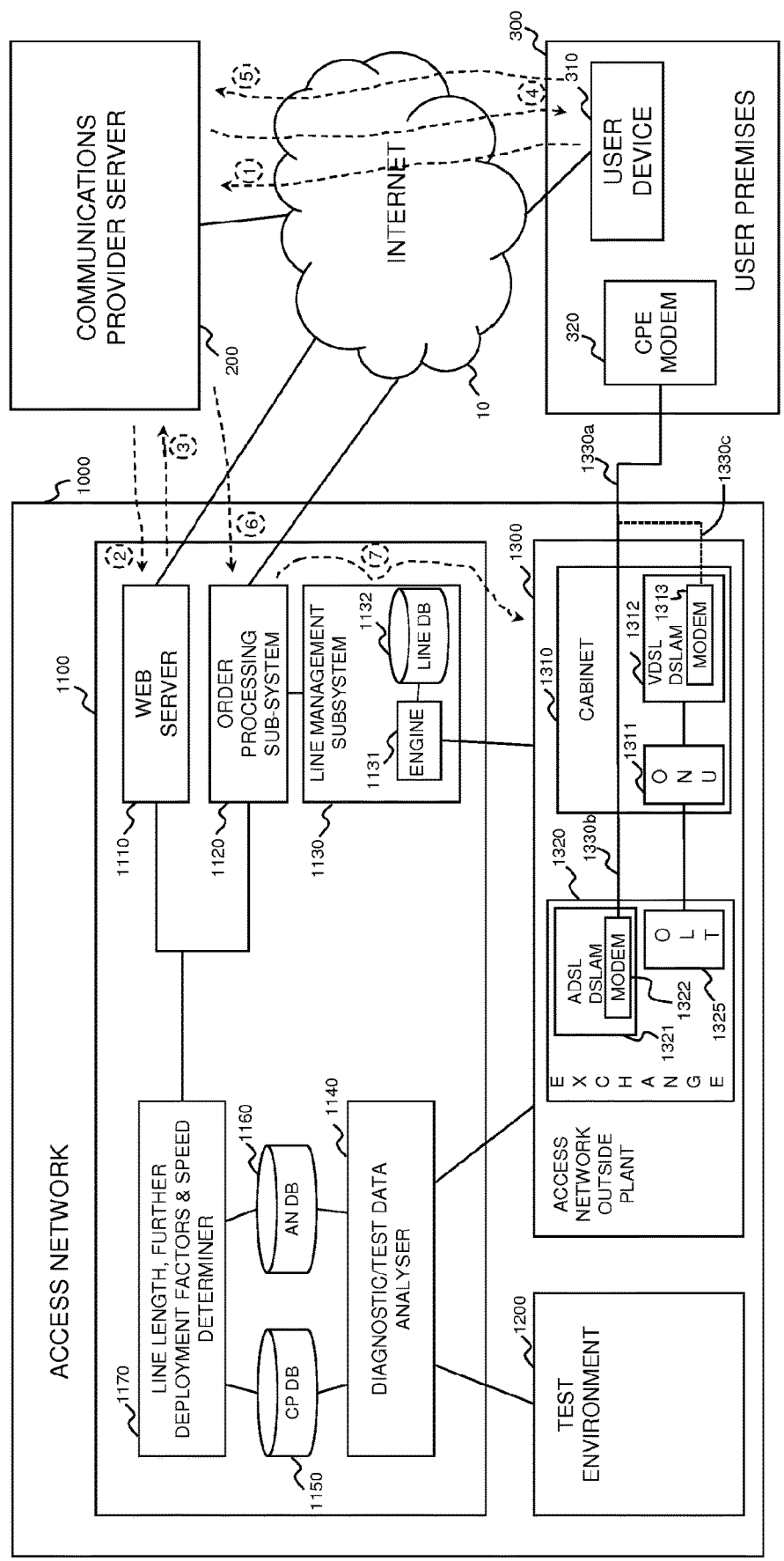
FIG. 1 is a schematic overview of a telecommunications system including a communications provider server, the Internet, a user's premises and an access network in accordance with an embodiment of the present disclosure.

FIG. 1 illustrates a telecommunications system including an access network in accordance with an embodiment of the present disclosure. The system comprises an access network 1000, a Communications Provider Server 200 and a user premises 300. The user premises 300 includes a device 310 which is able to connect to the Communications Provider server 200 via the Internet 10. The user premises 300 additionally includes a Customer Premises Equipment (CPE) modem 320 for setting up a DSL-type connection over a twisted copper pair connection 1330a, 1330b which forms part of the access network 1000.

The access network 1000 includes a set of access network support systems 1100, a test environment 1200 and an access network Outside Plant (OP) 1300. The access network OP 1300 includes a cabinet (also referred to as a Primary Cross-connection Point (PCP)) 1310 which contains a Digital Subscriber Line Access Multiplexer (DSLAM) 1312, which includes a VDSL DSLAM modem 1313 and an Optical Network Unit (ONU) 1311. Additionally, the access network OP 1300 includes an Exchange building 1320 which includes an ADSL DSLAM 1321 which includes an ADSL modem 1322 which is connected to an access network side end of the twisted copper pair connection 1330b which forms part of the access network 1300. The set of support systems 1100 includes: an Access Network (AN) web server 1110; an order-processing subsystem 1120; a Line Management subsystem 1130, which includes a line management engine 1131 and a line profile database 1132; a Diagnostic/Test Data Analyzer 1140; a CP database 1150; and an Access Network Database 1160.

The detailed operation and functions of each of these elements (in so far as they are relevant to an understanding of embodiments of the present disclosure) will be described later in the present specification, with additional reference to FIGS. 2-4, in the context of some example operations. However, as a brief overview, the function of these elements is now briefly described herein.

The Communications Provider (CP) Server 200 provides web server functionality to offer web services to its customers and prospective customers, in particular enabling users to perform a speed test in which an estimation is made and provided to a user of the likely potential broadband speed available to the user if they were to obtain a new broadband service from the CP. In order to do this it includes functionality for contacting the Access Network (AN) web server 1110. The CP server 200 is also able to order a new broadband connection to be set up with the assistance of the NO by sending an order request to the order processing subsystem 1120 of the NO systems—possibly in response to an order for such service being submitted by a user to the CP server 200 (which is also capable of receiving and processing such user orders).

The user premises 300 (e.g. a house) is connected to an incoming twisted copper pair connection 1330a, 1330b (i.e. a telephone or subscriber line) which forms part of the access network providing a route for telephony and data services to the user premises 300. A modem (in particular an ADSL modem) is assumed to be attached to the connection in the present example. The present specification discusses a case in which a new service is to be provided to the user which will require a new upgraded modem capable of operating in accordance with the new broadband technology to be employed (we consider, for exemplary purposes, a case where a user is upgrading from an ADSL service to a VDSL service such as BT's "Infinity" Broadband service). The modem is also, in the present example, capable of setting up a "wifi" hotspot such that it may communicate with device 310 which in this example is considered to be a wifi enabled tablet device. Via this user device 310 a user is able to browse to the CP's web site in order to perform a "broadband speed test" to see what sort of speed of broadband connection s/he might be able to obtain by upgrading her/his broadband connection using an offer to carry out such an upgrade made by the CP via its web site which is hosted by the CP server 200.

As mentioned above, the access network 1000 includes a set of access network support systems 1100, a test environment 1200 and an access network OP 1300. Each of these is now briefly discussed in reverse order.

The access network OP 1300 generally designates the infrastructure which actually carries user data (such as cables—optical and metallic—cross-connection points, distribution points, modems ONUs and OLTs and equipment contained in exchange buildings, etc.). As such, the access network OP 1300 of FIG. 1 is illustrated as including a street cabinet (Primary Cross-connection Point (PCP)) 1310 which in this example is a VDSL enabled cabinet and is connected to a fiber optic connection 1331 which connects up-stream away from the user premises. The fiber optic connection is connected to an Optical Network Unit (ONU) 1311 which terminates the fiber optic connection as part of a Passive Optical Network in a known manner. The Cabinet 1310 additionally includes a Very-high-speed Digital Subscriber Line (VDSL) Digital Subscriber Line Access Multiplexer (DSLAM) 1312 (note that other types of Access Node (AN) could be used here instead of the DSLAM) which includes a VDSL modem (typically in the form of a line card) 1313 to which the first portion 1330a of the twisted copper pair 1330a,1330b extending from the user's premises 300 is able to be connected as illustrated by the dotted line 1330c. The access network OP 1300 additionally includes an Exchange building 1320 which includes, in this example, an access network Asymmetrical Digital Subscriber Line (ADSL) DSLAM 1321 which includes an ADSL modem (typically also in the form of a line card) 1322 which is connected to the access network side portion 1330b of the twisted copper pair 1330a,1330b extending from the user's premises 300. In the present example, broadband services are provided over the ADSL connection between the access network (DSLAM) ADSL modem 1322 and the CPE modem 320 via the twisted copper pair connection 1330a,1330b. The Exchange 1320 additionally includes an Optical Line Termination (OLT) 1325 which connects to the ONU 1311 in the street cabinet 1310 via the fiber optic connection 1331 in a known manner. Whilst the CPE modem 320 is an ADSL modem 321 operating using ADSL it is connected directly via twisted copper pair connection 1330a,1330b to the ADSL modem 1322 in the Exchange 1320. If the user were to upgrade to a VDSL service, the twisted copper pair 1330a,1330b could be cut between the first 1330a and second 1330b portions of the twisted copper pair connection and connected to the VDSL DSLAM modem 1313 in the VDSL DSLAM 1312 located in the cabinet 1310; a new VDSL capable CPE modem (not shown) could then be installed at the user premises. Broadband communications between the new VDSL CPE modem and the Exchange would then be communicated via a VDSL connection between the CPE VDSL modem (not shown) and the DSLAM VDSL modem 1313, over the first portion 1330a only (of the twisted copper pair connection 1330a,1330b), and then on via the ONU 1311, the fibre optic 1331 and the OLT 1325 to the exchange for further onward connection as before.

The access network 1000 additionally includes a Test Environment 1200. Such a facility is typical within a Network Operator's organization and permits testing of pieces of telecommunications equipment which parties wish to use on the access network operated by the network operator. In particular (for the purposes of the present embodiments), the test environment is able to generate measurements of rate (either or both of a downstream and upstream rate) for various different reach values for a particular pair of modems using a specified broadband transmission technology (e.g. ADSL, VDSL, G.fast, etc.) over various different types of twisted metallic pair connections as commonly found within the actual network. From these measurements the Diagnostic/Test Data analyzer 1140 (discussed below) is able to generate appropriate rate versus reach curves or offsets, etc. as well as to generate correlations between measurements of electrical length and physical length which can additionally be used to generate a mapping function between these.

Finally, the access network 1000 additionally includes a set of access network support systems 1100. The support systems 1100 include the Diagnostic/Test Data Analyzer 1140 which processes measurements of, in particular, rates achieved over various different types of lines using different combinations of modems. It analyses these using standard statistical methods to generate either a set of curves for specific modem type combinations of typical achievable rates versus reach (i.e. physical and/or electrical length) of twisted-metallic-pair lines over which the (DSL) connection is operating. More details of the methods performed to achieve this are described below with reference to FIGS. 2 and 3. The resulting rate versus reach curves (or more precisely data representing these curves) are then stored in a Communications Provider Database 1150 together with data about the type of modems typically provided by different CP's to their customers for different services, etc. The support systems 1100 additionally include an estimated line length, further deployment factors and speed determiner module 1170 which performs various database lookups and additional processes as necessary in order to obtain an estimated line length from an identification of a line together with an indication of the broadband technology to be used on the line, as well as to obtain further deployment factors based on an identification of an associated Communication Provider to provide the upgraded service to the end user, and then to use the determined length and further deployment factors to finally determine an estimated speed for the potential new connection post upgrade. In the present embodiment, the further deployment factors used are simply the expected DSLAM modem to be used in the new connection once deployed and the expected CPE modem to be used in the new connection once deployed.

The former further deployment factor (DSLAM modem type) is obtained, in the present embodiment, by identifying the cabinet or distribution point at which the new connection is expected to start (after deployment) based on the type of broadband technology to be used—and this can be identified by searching the AN database 1160 to see which cabinet and distribution point the connection currently passes through together with network planning information (also stored in the AN database 1160) specifying whether a new connection for that line of a specified technology type is available to that line or not and if so from which point the connection will start (e.g. whether from the cabinet or a distribution point closer to the customer premises). Having identified which network location the connection will start from, the AN database 1160 (in the present embodiment) additionally contains data specifying the type of DSLAM in place at that location (or intended to be installed if not yet already installed there).

The latter further deployment factor (the CPE modem estimated to be used) is obtained by querying the CP database 1150 which stores, in the present embodiment, an expected CPE device to be used based on the identity of the CP. In respect of upgrades to VDSL2 connections, this is generated, in the present embodiment, by the network operator ascertaining in any appropriate manner a CPE type which is normally used by the respective CP for VDSL2 connections and manually storing this in the CP database. For G.fast connections this is generated, in the present embodiment, by determining the most commonly used CPE modem on lines recently upgraded to G.fast associated with the respective CP, within a predetermined period of time (e.g. in the past 3 months).

The support systems 1100 additionally include a web server 1110 which, in the present embodiment, is operable to present a web page to directly browsing users via which a (directly browsing) user can request an estimate of the speed of broadband connection (i.e. its rate) which they can expect to achieve with their line using a service obtained from a specified Communication Provider. If the web page is being directly accessed by a user the web page permits the user to enter not just information enabling the user's line of interest to be identified (e.g. by a telephone number) or to be approximately identified (e.g. by a post code) but also identification information about the particular Communication Provider (CP) of interest as well as information specifying a type of broadband technology of interest (e.g. VDSL or G.fast). The line and CP identification information is passed to the line length, further deployment factors and speed determiner module 1170 which is operable to determine, from the identification (information) of the twisted metallic pair connection and the type of digital subscriber line protocol of transmission of interest, an estimate of the length of the twisted metallic pair connection, or a portion thereof, over which the digital subscriber line protocol of transmission of interest is to be deployed and, from the indication of an expected type of deployment, associated deployment factors, and is further operable to determine an estimated potential achievable data rate at which the digital subscriber line protocol of transmission is able to transmit data over the twisted metallic pair connection, or portion thereof, in dependence upon the determined estimate of the length of the twisted metallic pair connection, or portion thereof, and further in dependence upon the determined associated deployment factors and the type of digital subscriber line protocol of transmission of interest. In particular, the line length, further deployment factors and speed determiner module 1170 uses the line identification information to query the Access Network Database (AN DB) 1160 which stores information about the structure of the network operator's network including information about the length of lines in the network (or alternatively of location data of network elements which is then used with a mapping database to generate path length estimates based on the locations of points along the path). The line length information obtained in this way (using data taken from the AN DB 1160) together with the identity of the CP is then used to query the CP database 1150 to determine an estimated potential speed or rate of the proposed connection using the proposed new service by selecting an appropriate curve (using appropriate deployment factors which may just be the CP identity) and looking up the associated speed on that curve for the estimated length, or by applying these parameters to a suitable model). The estimated speed is then returned by the line length, further deployment factors and speed determiner module 1170 to the web server 1110 which in turn then passes this back to the requesting user via an update of the web page (for example).

Additionally, the web server 1110 is operable to receive machine to machine requests which are assumed to arrive from a communication provider whose identity can be ascertained from the query itself, e.g. either by this information being explicitly encoded in the request or by for example determining the network address of the sending machine and mapping this via a predetermined mapping to the associated Communication Provider. Such requests (which constitute the deployment indications referred to in the appended claims) are then processed in a similar manner to requests received directly from a browsing user (which also constitute deployment indications) to perform a look up to the CP database 1150 and the results are then passed back via a machine to machine communication (e.g. as a SOAP message).

The support systems 1100 additionally include an order processing sub-system 1120 which is operable to receive machine to machine requests from a server belonging to an associated Communication Provider specifying a requested service/product from the network operator. The request specifies details of the Communications Provider and of the line on which the service is to be provided. In an example case where the order is for a VDSL service (e.g. to be provided to the User premises 300 to provide an upgrade from an ADSL service to a VDSL service), the order processing system instigates processes such as generating an invoice to send to the Communications Provider and generating an order process including steps such as arranging an engineer visit to cut the twisted copper pair connection 1330a,1330b and re-connect the first portion 1330a thereof directly to the VDSL modem 1313 in the Cabinet 1310, etc.

Additionally, in the present embodiment, the order processing sub-system 1120 is operable to use the information about the line over which the connection is to be formed and the identity of the CP to send a request to the line length, further deployment factors and speed determiner 1170 which in turn uses this information to query the AN DB 1160 and CP database 1150 in a similar manner to that described above with respect to the web server 1110 in order to obtain an estimated rate achievable for the line given the CP identity and the length of the line over which the service is to be sent. Such information is then provided back to the order processing subsystem and thence on to the line management sub-system 1130 which uses this information to select an initial line profile for use in performing an initial configuration of the line when the new service is to be provided (by forwarding on the selected initial line profile to the respective DSLAM). Note that when the new service is to be provided over a changed line to that over which an existing service is operating (e.g. supplying a VDSL service over portion 1330a only compared to the existing service in which ADSL is provided over both portions 1330a and 1330b of the connection 1330a,1330b) it may be possible for the length of the new connection to be determined by waiting until the new connection is formed (e.g. by an engineer cutting the twisted pair connection between portions 1330a and 1330b and reconnecting portion 1330a to the VDSL modem 1313 within the cabinet 1310—as shown by the dotted line 1330c in FIG. 1) and then performing a test on the new line (which can preferably be performed using the existing ADSL CPE modem 320) to assess the electrical length of the line 1330a and then using this measurement to update the AN DB 1160 about the new line and the length thereof and then sending a query to the line length, further deployment factors and speed determiner 1170 which in turn operates in the manner described above with respect to the web server 1110 involving querying the AN and CP databases 1160,1150 in order to obtain an estimated rate for the new line based on the updated length and the CP identity. The estimated rate obtained in this manner can then be used to determine the initial starting profile for the line once the CPE modem is replaced with a new modem (e.g. a new CPE VDSL modem (not shown) as provided by the CP).

Note that in the present embodiment, the line length, further deployment factors and speed determination module 1170 together with the CP and AN databases 1150 and 1160 and the web server 1110 and/or the order processing sub-system 1120 together can be considered as constituting the broadband speed estimation tool of the third aspect of the present disclosure. In particular, the web server referred to therein could be either the web server 1110 of FIG. 1 and/or the order processing sub-system 1120. Indeed, in some embodiments, the functionality of the order processing sub-system could be completely subsumed within a single web server, etc.

The line management subsystem 1130 is operable to monitor the operation of lines in the access network and to modify the Line Profile applied to each line (meaning here line plus both modems) based on the results of the monitoring. It does this primarily by monitoring the number of errors and resynchs occurring on each line and changing the profile applied to a line based on the observed number of errors and resynchs per unit of uptime in a generally known manner. However, in addition to these conventional operations, it is further operable to select an initial profile for a "new" line (i.e. one which is to operate using a new broadband technology) based on a provided estimated achievable rate of the line. In particular, in the present embodiment, it selects an initial profile which has a rate cap which is within a predetermined amount of the provided estimated achievable rate.

The line management sub-system includes a Line Profile Database (LPDB) 1132 which stores a plurality of Line Profiles and possibly a plurality of discretized parameter values which can be combined to form a Line Profile in some embodiments. Each of these Line profiles includes a downstream rate cap value specifying a maximum (downstream) rate which that line is able to synchronize at and the Line Profiles can be grouped into groups of Line profiles each having the same rate cap value, wherein the groups can be ranked based on rate cap value and one can consider that each group thus ranked is a number of "steps" above or below any other group based on the position within the ranked order relative to another group. In one embodiment an initial Line Profile is then chosen by selecting a line profile which has standard initial Line Profile values for other parameter values within the Line Profile (e.g. target margin of 6 dB, non-interleaved, etc.) and a rate cap value which places it in the group of Profiles which is one step above the group whose rate cap just exceeds the estimated achievable rate (i.e. for which the group of profiles one step below has a rate cap which is below the estimated achievable rate). For example if there are 4 groups of VDSL Line profiles having downstream rate caps of 30 Mbs (Megabits per second), 40 Mbs, 50 Mbs and 60 Mbs respectively, if an estimated achievable (downstream) rate of 39 Mbs was determined, then a Line Profile would be selected from the group of Line Profiles having a rate cap of 50 Mbs. A similar process may be used with respect to upstream rate or the process could rely on just downstream rate.

If vectored profiles are being used, then a Line Profile could be generated in a similar manner by first selecting the downstream rate using a similar principle and then selecting other parameters with standard initial values and combining them together to form a Line Profile which is then applied to the new line.

Figure 2:
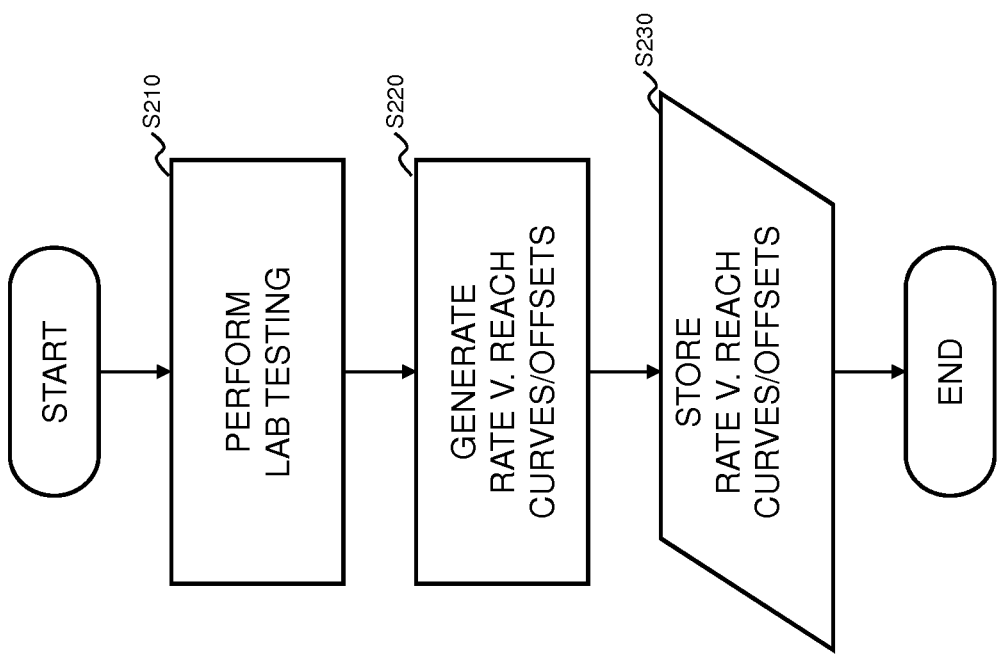
FIG. 2 is a flow chart showing in overview the process for generating rate versus reach curves and/or offsets in an embodiment in which lab tests are performed.

Turning now to FIG. 2, a first example method is described of generating rate versus reach curves for use in embodiments of the present disclosure. FIG. 2 in particular illustrates a first such method in which Laboratory testing of equipment is used in order to generate the curves. The method thus commences at S210 with laboratory testing being carried out with different combinations of DSLAM equipment and different end user modems being used over laboratory recreations of typical subscriber lines of changeable length and with different common conditions able to be incorporated into the test line. Clearly, the better the equipment used to recreate typical subscriber lines within the actual network on which methods according to embodiments of the present disclosure are to be used, the better, and therefore it is preferred if the laboratory equipment used can simulate such phenomena as bridge taps, slightly shorted lines etc.; however, embodiments of the disclosure can nonetheless operate with fairly basic simulations of lines (e.g. using a big roll of twisted metallic pair cable and cutting different lengths of cable from it to simulate lines of different lengths).

Having performed a large number of tests with different combinations of simulated line lengths and different modems, the method proceeds to S220 in which standard statistical analysis techniques are used to fit curves to the points. This can be done in any number of ways with different techniques achieving different but predictable outcomes. A basic approach (as is adopted in the present embodiment) is to generate a single rate versus reach curve for each pair of modems, in which an average rate value for a particular length of line is generated for different types of lines (e.g. those suffering from bridge taps, etc.). Alternatively different rate vs. reach curves could be generated dependent on not only the length of the line but also dependent on the type of line (e.g. whether it has a bridge tap or not). It may also be possible to take into account defects (such as a bridge tap) by using an offset (which may be absolute—e.g. a 3 Mbs reduction—or relative—e.g. a 10% reduction) to obtain a mathematical equivalent (or approximation to) a separate rate vs. reach curve.

Having thus generated a set of suitable curves and/or offsets, etc., the method then proceeds to S230 in which the curves and/or offsets themselves are stored in the CP database 1150 ready for use in generating estimated bandwidths/downstream rates, etc. Having thus stored these curves and offsets etc., the method ends.

The method can be repeated whenever a new modem is available to be used in order to generate further sets of rate versus reach curves for different combinations of DSLAM and CPE modems.

Figure 3:
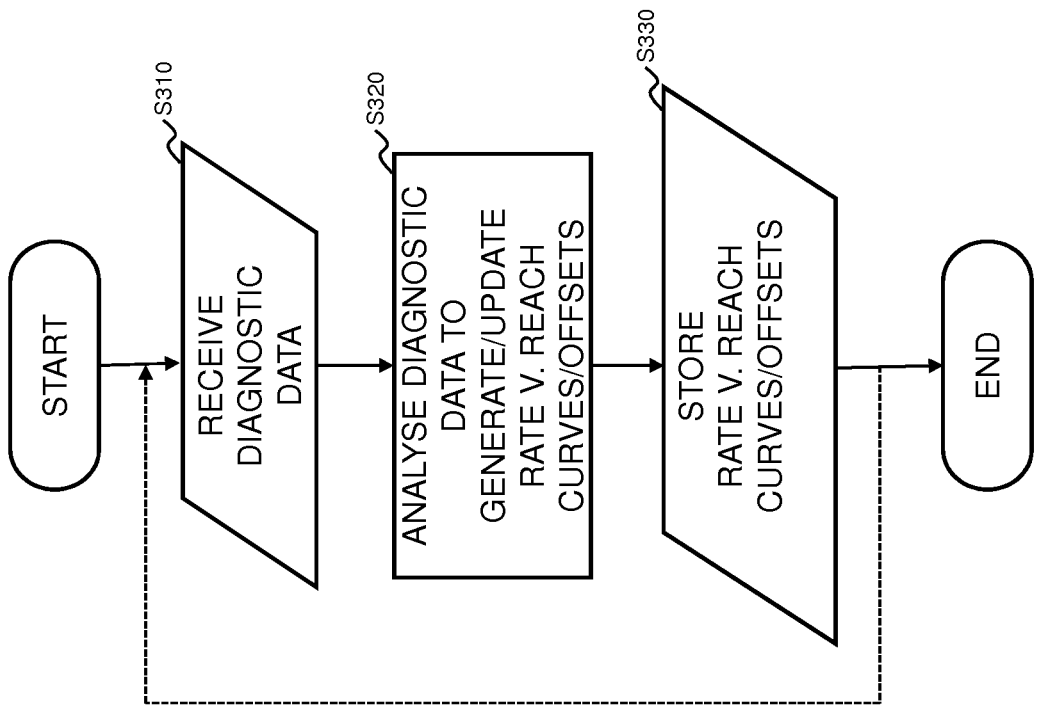
FIG. 3 is a flow chart showing in overview the process for generating rate versus reach curves and/or offsets in an embodiment in which diagnostic data from the access network is used.

FIG. 3 illustrates an alternative method of generating rate vs. reach curves in which live diagnostic information is used instead of laboratory test results. This method begins at S310 with the reception of diagnostic data received from the access network. The nature of the diagnostic data is likely to depend upon the broadband technology being employed by the devices in the network which are generating the diagnostic data. For example in the case of VDSL2 lines (operating in accordance with the ITU-T G.993.2 standard) then a key piece of data (in addition to the actual upstream and downstream rates (broadband speeds) achieved by the modems is the Hlog data which VDSL2 modems generate). From this Hlog information it is possible to generate an estimate of the electrical length of the line in question, which in turn can be converted into an estimated physical length. Electrical length is preferably generated using the method set out in the above mentioned U.S. Pat. No. 8,588,285. From this estimated electrical length, an estimated corresponding physical length is then generated, in the present embodiment, using a mapping function mapping between electrical and physical lengths, generated in the test environment 1200 by obtaining several pairs of values of electrical length determined using the techniques specified in U.S. Pat. No. 8,588,285 and corresponding physical lengths measured directly in the test environment. This information (i.e. Hlog information) about line lengths (electrical and physical) reported directly by the modems needs to be supplemented with information about the type of modems being used. This information might not be directly reported by the modems and so in such a case the system needs to access such information from other sources—e.g. from the Access Network Database 1160 in the case of information about the type of DSLAM modem in use and from the CP database 1150 for CPE modem's in the present embodiment, etc.

In an alternative embodiment, where no such information about the type of CPE modem in use is available, the identity of the CP is used directly in place of information about a type of CPE modem being used. In this way, if the CP changes the CPE modems which it provides, the system will start to see changed measurements of rate vs reach which will over time tend to cause a change in the associated rate vs reach curve as will become apparent from the discussion below.

If the reporting modems are operating using G.fast such that ITU-T G.997.2 applies (see for example table 7-13 thereof), then the modems additionally report details about the type of modems in use in addition to Hlog information from which it is possible to generate different curves for different specific CPE modems. In such a case functionality is preferably provided within the web server 1110 and/or order processing subsystem 1120 in order to estimate which curve should be applied (or equivalently to decide which CPE modem is (likely) to be used by a particular CP) when seeking to perform a maximum achievable downstream rate estimation.

It should be noted that as the modems are operated they are likely to be moved onto different line profiles over time by the line management subsystem and as such they may achieve a steady state downstream rate of actual operation which differs from the speed at which the modems first start to operate when they are first put into service. As a result, for the purposes of generating suitable rate versus reach curves, it is preferable if the diagnostic data is continually updated and that only the most recent such data is used in generating rate versus reach curves. This is also beneficial for embodiments in which no effort is made to identify which CPE modems a CP provider is using and instead just the identity of the CP is used. In such a case if the CP starts to provide better CPE modems to its customers a corresponding increase in rate for any given reach will manifest itself in the updated rate vs. reach curve appropriate for that CP.

Returning back to FIG. 3, upon completion of S310, once the diagnostic/test data analyzer 1140 has obtained sufficient data from operational lines within the system to generate a curve, the method proceeds to s320 in which appropriate curves are generated. Additionally, this process is expected to operate continuously with new data adding to or overwriting (if it relates to the same line) old data and is used to refine any existing curves and/or offsets (as indicated by the dotted line returning flow after S330 back to S310). Again any known statistical techniques can be employed for generating suitable curves from specific rate versus reach observations obtained from the received diagnostic data coming from the modems.

Once a curve has been generated or updated at S320, the curve is stored at S330 ready to be used in performing maximum achievable downstream rate estimations. As mentioned above, this method is expected to operate continuously and so can be thought of as continually iterating around from S330 back to S310.

In terms of using the stored rate versus reach curves, where the newly upgraded service being provided is G.fast it may be possible to use a default temporary Line Profile initially and then to wait for the modems to populate their Management Information Bases (MIBs) with information about the type of modems being applied and then to use this information to generate an estimated achievable speed by using a curve specific to the identified modems and by looking up on the specific curve the estimated achievable speed for a length determined from the Hlog measurements also stored in the MIB of the DSLAM modem after initially connecting the modems using a temporary initial Line Profile, and then immediately changing the temporary profile to one determined as a result of the determined estimated achievable speed.

Similarly, where the new service to be provided is a VDSL2 service, instead of estimating physical length from access network database 1160 containing physical location information, the modems could initially train up using a default, temporary, initial profile in order to allow the MIBs of the modems to populate themselves with Hlog data and then this data can be read and used to generate a length estimate for the (new) line which is then used to generate an estimated maximum achievable downstream rate using the appropriate curve, and then a suitable initial line profile is selected (or generated) and applied based on the estimated achievable maximum downstream rate and then this newly selected suitable profile is applied immediately in place of the temporary one.

In both of the above cases the initial temporary default line profile is preferably a very low-rate conservative profile to ensure that synchronization will occur without problems. Based on the results of the maximum achievable downstream rate estimation it is then likely that the profile may be changed to a less conservative, higher performance profile.

It should also be noted that in further preferred embodiments, both the approach of performing initial lab testing to generate rate versus reach curves as illustrated in FIG. 2 and the approach of using statistical analysis of actual deployed lines as illustrated in FIG. 3 could be used in conjunction with one another. In particular, an initial set of curves can be generated using lab measurements and thereafter these curves can be continuously updated to improve their connection with in the field deployments using the process illustrated in FIG. 3 to update the curves over time.

Figure 4:
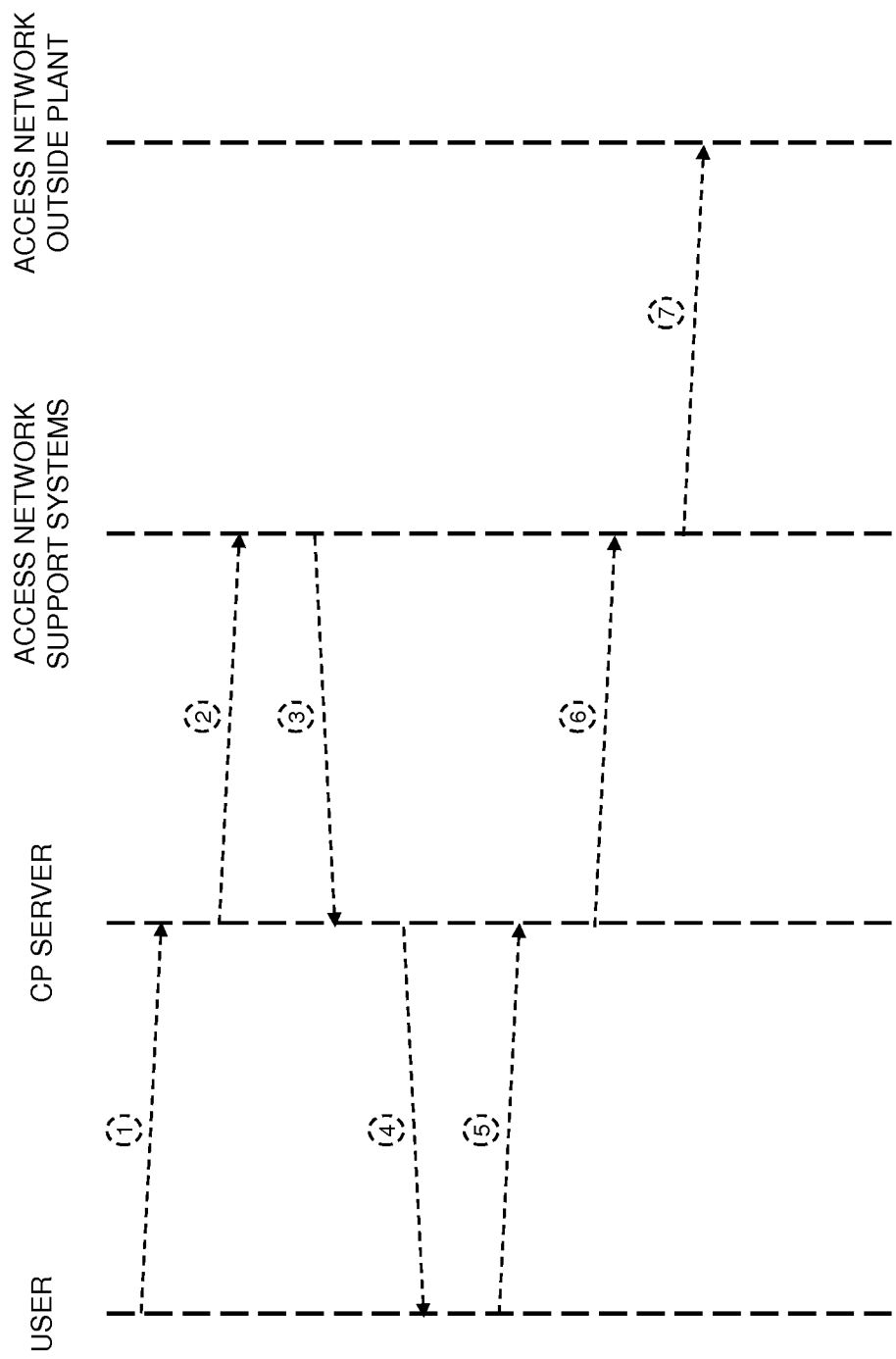
FIG. 4 is a timing diagram illustrating the signals passing between elements of FIG. 1 in order to provision a new broadband service onto a line over the access network to the user's premises.

Turning now to FIG. 4, there is shown, in overview, an example flow of messages between different elements of the system of FIG. 1 in order to perform a provision of a new service according to an example embodiment. The messages are shown as solid arrows labeled from ①  to ⑦ on FIG. 4 and also as dotted arrows also labeled from ① to ⑦ on FIG. 1.

The process of FIG. 4 commences with a first message ① being transmitted from the user device 310 to the (web) server 200 of the CP (via Internet 10) requesting an estimation of the expected broadband rate which the user might experience if s/he were to upgrade to a new (e.g. VDSL) service using the CP. The request includes information identifying the line to potentially be upgraded (e.g. the PSTN telephone number associated with the line) using any conventional web technology (e.g. an HTML form, etc.) as well, naturally, as an indication of which new service is of interest to the user. This may be facilitated by the CP server providing a text box specific to the identified new service into which the user can type data identifying the line (e.g. the PSTN telephone number of the line).

The CP server 200 responds to this first message ① by generating its own request (again using any suitable web technology—e.g. generating a SOAP request) as second message ② which includes details of the identification of the line to be upgraded as received from the user (in the first message ①) as well as the type of new service of interest (e.g. VDSL or G.fast) and then sending this to the web server 1110 within the access network support systems 1100.

The access network web server 1110 responds to the received second message ② by using the identification of the requesting CP to identify an appropriate rate versus reach curve to use and then using the identification of the line to potentially be upgraded to estimate the length of the new line after upgrade and then from that to look up from the rate versus reach curve an estimated maximum (downstream) achievable rate.

As mentioned above, in order to estimate the length of the new line after upgrade, the system firstly determines what type of upgrade is potentially occurring by identifying the current broadband service being provided on the identified line (which information is stored in the AN DB 1160), identifying the new technology to be used in the event of the upgrade of interest occurring (as identified by the user in the original request and forwarded in the request from the CP) and identifying the line to potentially be upgraded (also obtained from the request from the CP) and from this determining which point in the access network the new connection will start from (e.g. typically the associated street cabinet if the line is upgrading from ADSL (e.g. ADSL2+) to VDSL (e.g. VDSL2)), and the geographical location thereof and where it will terminate (at a user's premises), and the geographical location thereof, as well as the geographical locations of any intermediate distribution points through which the line passes and then consulting a geographical/map database in order to calculate a path length from the identified locations of the end points and the intermediate points (if any).

Having obtained an estimated maximum achievable downstream rate (and possibly an associated estimated maximum achievable upstream rate if a simple one to one mapping between downstream rates and upstream rates is used) from the appropriate rate versus reach curve with any offsets etc. the access network web server 1110 then replies to the second message ② with a third message ③ containing the estimated rate sent to the CP server 200.

The CP server 200 then generates a fourth message ④ (e.g. in the form of an updated web page or a variable in the web page which can be updated locally etc.) which is sent to the user device and provides the user with the estimated maximum achievable downstream rate.

In the present example it is assumed that based on the provided maximum achievable downstream rate obtainable with the new service, the user decides to order the new service from the CP. The user therefore interacts with the web page provided by the CP server 200 in such a way (e.g. by filling in an order form provided on the web page) as to cause a fifth message ⑤ to be sent from the user device 310 to the CP server 200 containing the necessary information to permit an order to be raised (e.g. line identification data, payment information, etc.).

The CP server 200 then processes the order information in order to generate a further order request message ⑥ (e.g. in the form of another SOAP message) to be sent from the CP server 200 to the access network support systems 1100 (and in particular to the order processing subsystem 1120 of the access network support systems 1100). This starts the process for an order for the new connection to be formed for the user, which is paid for by the CP who acts as an intermediary/reseller in this arrangement, in known manner.

As discussed above, the order processing system causes various order fulfillment procedures to occur in a known manner, including, for example, arranging an engineer visit to cut the line 1330a,1330b if necessary and connect the remaining final leg 1330a to the VDSL modem 1313 within the VDSL DSLAM 1312. Once the newly connected line is functioning there are various possibilities, as will be understood by a person skilled in the art of access network operations, for continuing operation such as waiting until the new CPE modem has been connected within the user's premises (either by an engineer typically from the CP or by a self-install of the CPE modem which is typically provided by post to the user from the CP) and then initiating a new VDSL connection, or by having the line operate using an ADSL connection if the VDSL modem is capable of doing so. In any event, in all cases as soon as a DSL connection can be established which enables Hlog data to be populated within the MIB of the VDSL modem 1312, the diagnostic/test data analyzer 1140 preferably obtains the Hlog data and uses it to calculate an improved set of line properties (e.g. an electrical length of the line) and then updates the AN DB 1160 with this information. Having updated the information, the Line Management subsystem 1130 is notified that the information has been updated and a new lookup into the AN DB 1160 is performed to obtain an updated length estimate which in turn is used to obtain a new estimate for the maximum achievable downstream rate. This is then used to select or generate an initial line profile in the manner already described above and finally the selected or generated line profile is sent from the Line management subsystem 1130 of the operator support systems 1100 to the VDSL DSLAM 1312 of the access network OP 1300 in a seventh message ⑦; this message ⑦ is therefore illustrated as travelling from the order processing subsystem 1120, to the Line management subsystem 1130 and then on to the access network OP 1300 (where it is forwarded to the respective DSLAM and used to update the line profile for the respective modem located therein). The line (including the DSALM VDSL modem 1313, the twisted copper connection 1330a, and the new CPE modem (not shown)) then initially operates using this line profile transmitted in this message.

Variations

Persons skilled in the art of access network operations will appreciate that many variations and modifications could be made to the above described embodiments.

For example, to enhance the sophistication of dealing with properties of actual lines within a network such as bridge taps, it has already been mentioned that different curves could be generated and used depending on a particular combination of such properties. In a simplest case different curves could be generated for lines having a bridge tap as distinct from those not having a bridge tap. Since bridge taps normally reside at or very close to a user's premises, it is preferable if a determination of whether a new line will have a bridge tap or not is made based on a determination of whether or not the existing line also has a bridge tap and assuming that the absence or presence of a bridge tap will not change when converting the existing line into a new (typically shorter) twisted copper pair connection. The appropriate curve is then used when generating an estimated maximum achievable downstream rate.

Additionally, instead of using simple rate vs. reach curves, it is possible to use a model of greater or lesser sophistication to enable a determination of an estimated maximum achievable rate. Such a model could be used to generate specific values for not just a downstream rate but also an upstream rate. Such models could also be based on certain measurable or determinable properties of the modems (e.g. the chipsets employed, the noise floor of the modems, etc.) and on the respective twisted copper pair connections etc.

In terms of deriving the CPE models, there are a number of approaches that could be taken:
1. Lab rate vs reach evaluations of the CPE modems with predetermined DSLAMs and use them directly in line qualification.
2. Use of the lab measurements to characterize the CPE modems to drive a parameterized model.
3. Use of a generalized rate vs. reach curve, with an offset for vendor's performance derived from lab assessments.
4. Use of live field data using the CPE vendor/model ID to create a "real world" rate vs. reach model (where such info is available as it is for G.fast cases—for VDSL cases it may be necessary to restrict the models to being applicable just to certain vendors as discussed above).

In all cases, either a per modem type view (e.g. equipment vendor xxxYYY) could be used or a more generalized model could be used which considers factors such as Chipset vendor identification and any implementation penalty, etc.
The key parameters driving the performance:
Noise floor of the CPE (combination of chipset and implementation)
Bits per tone (whether the CPE modem uses a maximum of 12 or 14—and in future cases possibly even up to 15 bits per tone)
Transmit power (4 dB or 8 dB)—upstream and downstream Knowledge of these parameters (and other constants) enables an appropriate model to compute the predicted rate vs. reach. The key thing that changes performance on long lines is the noise floor and power. From a system perspective, options 1-3 immediately above could be calculated offline and saved in the CP database 1150, option 4 could be automated and learn new modems as they appear.

Focusing on option 4 in the particular case of upgrading to G.fast protocol connections, it could work as follows:
Lines start with a default, conservative rate vs reach profile
Identify new modems as lines appear—these are identified via the FTU-R vendor ID, version ID etc from ITU-T G.997.2 table 7-13,
These need to be considered in tandem with the G.fast DSLAM vendor also from G.997.2 table 7-13
Once enough lines have been identified to make the sample representative (one for each DSLAM type), the rate vs. reach can be calculated from the collected performance data (e.g. 997.2, 7.11.1.1 Net data rate (NDRds/us) and 7.10.7 Channel attenuation per subcarrier (HLOG)
HLog data will be processed to convert it into a calibrated loss to enable mapping to cable losses at a given frequency
Once calculated, the modem model replaces the default model for all future calculations
If the modem is a low performer, this is automatically flagged to the operation (and perhaps on to the communication provider)

In options where there is an array of rate vs. reach curves which can be looked up on a line estimation request, the modem the CP uses is used to look up the right rate vs. reach curve for the speed prediction. When CPs use multiple different modems, the following options could be employed:
Use of a weighted average of all the modem types for that CP to create a single rate vs. reach curve
Development of the line qualification interface to allow CP to tell the operator what CP is going to be used. This is subject to a possibility of error on the part of the CP (i.e. stating a high performance modem is to be used, but shipping a cheaper lower performance modem)—therefore the system preferably validates CP's indication through the line qualification interface by regularly comparing the supplied modem type to the data returned from the network.

The first above option has a significant advantage, as it will encourage positive CP behavior—i.e. the more they ship "good modems" the better their performance predictions will be.

Finally, this system could be linked to test and diagnostics, such that when you get a speed fault the current speed is compared to the predicted performance for that modem, rather than to a generic speed profile.

The invention claimed is:
1. A method of operating an access network in order to transmit data over a predetermined twisted metallic pair connection in accordance with a predetermined digital subscriber line protocol of transmission, the access network including an access network modem connected to, or operable to be connected to, the predetermined twisted metallic pair connection which is capable of transmitting and receiving signals over the predetermined twisted metallic pair connection in accordance with the predetermined digital subscriber line protocol of transmission, the method comprising:
receiving a deployment indication;
identifying at least two deployment factors associated with the received deployment indication including an estimated line length specifying an estimated length of the predetermined twisted metallic pair connection and one or more further deployment factors, wherein the one or more further deployment factors is at least one of a modem type or a modem chipset;
determining an estimated data rate specifying an estimated potentially achievable data rate at which the predetermined digital subscriber line protocol of transmission is able to transmit data over the predetermined twisted metallic pair connection, the estimated data rate being determined in dependence upon the identified deployment factors including the estimated line length and the one or more further deployment factors;

determining a value for each of one or more configuration parameters associated with the operation of the access network modem connected to, or operable to be connected to, the predetermined twisted metallic pair connection in dependence upon the estimated data rate;

deploying a customer premises equipment modem at a customer premises side of the twisted metallic pair, which the customer premises equipment modem being capable of transmitting and receiving signals over the predetermined twisted metallic pair connection in accordance with the predetermined digital subscriber line protocol of transmission; and operating the access network modem in accordance with the determined value or values of the one or more configuration parameters, wherein determining an estimated data rate in dependence upon the identified deployment factors comprises:

preliminarily generating a plurality of rate versus reach functions, each of the plurality of rate versus reach functions enabling an estimated data rate to be output for any input estimated line length within a predetermined range, for a plurality of different values of the further deployment factors or for different combinations of values of the further deployment factors where there are a plurality of further deployment factors;

selecting one of the plurality of preliminarily generated rate versus reach functions in dependence upon the one or more further deployment factor; and using the estimated line length, together with the selected rate versus reach function, to generate an estimated data rate.

2. The method according to claim 1, wherein generating an estimated data rate comprises:

preliminarily generating a model in the form of a function of estimated length and one or more further deployment factors and applying the model using the identified deployment factors including the estimated line length and one or more further deployment factors to generate an estimated data rate.

3. An access network comprising:

a twisted metallic pair connection over at least a portion of which data may be transmitted in accordance with a digital subscriber line protocol of transmission of one or more types;

an access network modem connected to, or operable to be connected to, the twisted metallic pair connection, or a portion thereof, and which is operable to transmit and receive signals over the twisted metallic pair connection, or a portion thereof, in accordance with a digital subscriber line protocol of transmission;

a broadband speed estimation tool including a web server and a line length, further deployment factors and speed determiner module, wherein the web server is operable to receive a deployment indication identifying the twisted metallic pair connection, an expected type of deployment and a type of digital subscriber line protocol of transmission of interest, wherein the line length, further deployment factors and speed determiner module is operable to determine, from the deployment indication, at least two deployment factors including an estimated line length, specifying an estimated length of the identified twisted metallic pair connection, or a portion thereof, over which the digital subscriber line protocol of transmission of interest is potentially to be deployed, and one or more further deployment factors, and is further operable to determine an estimated data rate specifying an estimated potentially achievable data rate at which the digital subscriber line protocol of transmission of interest is able to transmit data over the identified twisted metallic pair connection, or a portion thereof, in dependence upon the determined deployment factors including the estimated line length and the one or more further deployment factors; and a line management subsystem for determining an appropriate value for each of one or more configuration parameters associated with the operation of the access network modem connected to, or operable to be connected to, the twisted metallic pair connection, or a portion thereof, in dependence upon the estimated data rate;

wherein in response to a deployment of a customer premises equipment modem, at a customer premises side of the twisted metallic pair connection, or a portion thereof, which customer premises equipment modem is operable to transmit and receive signals over the predetermined twisted metallic pair connection, or a portion thereof, in accordance with the type of digital subscriber line protocol of transmission of interest, the line management subsystem is further operable to determine a value for each of one or more configuration parameters associated with the operation of the access network modem and to cause the access network modem to operate in accordance with the determined value or values of the one or more configuration parameters.

4. A non-transitory storage medium storing processor implementable instructions that, when executed by a computer processor, cause the computer processor to carry out the method of claim 1.

* * * * *